United States Patent

Potin

(10) Patent No.: US 6,880,601 B2
(45) Date of Patent: Apr. 19, 2005

(54) TIRE BEAD FACILITATING MOUNTING

(75) Inventor: Yves Potin, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/725,316

(22) Filed: Dec. 2, 2003

(65) Prior Publication Data

US 2004/0112498 A1 Jun. 17, 2004

(30) Foreign Application Priority Data

Dec. 11, 2002 (FR) .............................. 02 15879

(51) Int. Cl.⁷ ..................... B60C 15/00; B60C 15/06
(52) U.S. Cl. ..................... 152/543; 152/539; 152/547; 152/550; 152/552; 152/564
(58) Field of Search .................. 152/539, 542–545, 152/547, 550, 552, 564

(56) References Cited

U.S. PATENT DOCUMENTS

| | | | | |
|---|---|---|---|---|
| 5,660,656 A | * | 8/1997 | Herbelleauu et al. ........ | 152/547 |
| 6,179,029 B1 | | 1/2001 | Costa Pereira et al. | |
| 6,659,149 B1 | * | 12/2003 | Pereira et al. ............... | 152/544 |
| 2002/0170647 A1 | * | 11/2002 | Pereira et al. ............... | 152/451 |
| 2003/0062107 A1 | * | 4/2003 | Leblond et al. ............. | 152/547 |
| 2003/0150540 A1 | * | 8/2003 | Herbelleau et al. ......... | 152/451 |
| 2003/0150541 A1 | * | 8/2003 | Herbelleau et al. ......... | 152/540 |
| 2003/0150542 A1 | * | 8/2003 | Herbelleau et al. ......... | 152/540 |
| 2003/0155061 A1 | * | 8/2003 | Herbelleau et al. ......... | 152/540 |

FOREIGN PATENT DOCUMENTS

| | | |
|---|---|---|
| EP | 0 869 017 A1 | 10/1998 |
| WO | WO-01/39999 A2 * | 6/2001 |
| WO | WO-02/00455 A1 * | 1/2002 |
| WO | 02/30690 A1 | 4/2002 |

* cited by examiner

Primary Examiner—Adrienne C. Johnstone
(74) Attorney, Agent, or Firm—Burns, Doane, Swecker & Mathis, LLP

(57) ABSTRACT

A tire including two beads which are intended to be in contact with seats of a mounting rim and two sidewalls, this tire including first reinforcing threads forming a carcass reinforcement, each bead including an anchoring structure for the carcass reinforcement formed of at least one circumferentially oriented second reinforcing thread cooperating with an adjacent portion of the carcass reinforcement by means of an anchoring rubber material having an elasticity modulus at 10% deformation at least equal to 30 MPa, wherein this tire includes, at least axially on one side of the anchoring structure of the carcass reinforcement, a rubber mix referred to as a "decoupling mix", this decoupling mix having an elasticity modulus, at 10% deformation, less than half of the elasticity modulus of the anchoring mix.

8 Claims, 1 Drawing Sheet

TIRE BEAD FACILITATING MOUNTING

FIELD OF INVENTION

The present invention relates to tires for passenger vehicles, and more particularly to the structure of the beads of these tires.

BACKGROUND OF INVENTION

A tire comprising a novel type of anchoring of its carcass reinforcement in its beads was proposed in publication WO 98/54006. According to this document, this tire comprises a crown reinforced by a crown reinforcement, two beads and two sidewalls connecting the crown to the beads. This tire comprises a carcass reinforcement with first reinforcing threads arranged adjacent in the circumferential direction, each of said first reinforcing threads forming in the sidewalls a zero or low angle with the meridian direction from each bead to the crown. This carcass reinforcement is anchored within each bead to an anchoring structure comprising at least one second reinforcement oriented circumferentially and cooperating with an adjacent portion of the carcass reinforcement by means of an anchoring rubber mix. This anchoring rubber mix is such that its elasticity modulus for a deformation of 10% is greater than 20 MPa and preferably greater than 30 MPa.

This novel structure of the tire beads yields excellent results in particular in terms of endurance, that is to say good resistance to mechanical stresses over time. It has however been noted that the high rigidity of these beads, due, inter alia, to the presence of the second reinforcement and of the anchoring mix of high elasticity modulus greater than 20 MPa, could be the cause of difficulties in mounting and/or demounting a tire on/from its mounting wheel, in particular in the case of manual mounting and/or demounting operations. This problem is particularly significant for tires intended for passenger vehicles, these tires having low section heights and comprising very rigid anchoring structures. "Section height of a tire measured when the latter is mounted on its mounting rim" is understood to mean the height of said section of the tire viewed in meridian section (that is to say in an axial plane containing the axis of rotation) and measured between the mounting rim seat and the radially outermost part of the crown of the tire. "Relatively low section height" is understood in the present specification to mean a section height of less than 86 mm.

This problem is even more pronounced if the mounting rim comprises a rim seat which is extended axially towards the inside by a protrusion of low height (alternatively referred to as "hump") intended to hold the bead of the tire on its seat in the event of partial or total deflation of the tire. The presence of this protrusion or hump causes real difficulties when mounting a tire such as described above, and these difficulties may furthermore result in incorrect placement of the beads on the rim seats.

The objective of the present invention is to overcome this problem.

SUMMARY OF THE INVENTION

Hereafter, the following definitions are used:

"reinforcing thread": both monofilaments and multifilaments, or assemblies such as cables, plied yarns or alternatively any equivalent type of assembly, and this whatever the material and the treatment of these cords, for example surface treatment or coating or pre-sizing in order to promote adhesion to the rubber;

"contact" between a reinforcing thread and a rubber mix: the fact that at least part of the outer circumference of the reinforcing thread is in contact with the rubber mix; if the reinforcing thread comprises a covering or a coating, the term "contact" then means that the outer circumference of this covering or coating is in contact with the rubber mix;

"axial": a direction parallel to the axis of rotation of the tire; this direction may be oriented "axially towards the inside" when it is oriented towards the inside of the tire and "axially towards the outside" when it is oriented towards the outside of the tire;

"radial": a direction passing through and perpendicular to the axis of rotation of the tire; this direction is said to be oriented "radially towards the inside" when it is oriented towards the axis of rotation of the tire or "radially towards the outside" when it is oriented in the opposite direction, that is to say towards the outside of the tire;

"elasticity modulus" of a rubber mix: a secant modulus of extension at 10% deformation and at ambient temperature, the measurement being effected after a first accommodation cycle up to 10% deformation:

$$E_{10} = \frac{F_{10}}{S \times \varepsilon_{10}}$$

where:

$E_{10}$: secant modulus of extension at 10% deformation;
$F_{10}$: force of extension at 10% extension;
S: section of the test piece at the deformation of extension $\varepsilon_{10}$, in the case of rubber material, it is known that:

$$S = \frac{S_0}{1 + \varepsilon_{10}},$$

with $S_0$ representing the initial section of the test piece;

"circumferentially oriented reinforcing thread": a reinforcing thread oriented substantially parallel to the circumferential direction of the tire, that is to say, forming with this direction an angle which does not diverge by more than five degrees from the circumferential direction; and "a reinforcing thread oriented radially or alternatively in the meridian direction": a reinforcing thread forming an angle at least equal to 80° with the circumferential direction; this reinforcing thread may be contained substantially in one and the same axial plane (that is to say a plane containing the axis of rotation of the tire) or in a plane forming an angle less than or equal to 10 degrees with an axial plane.

A tire according to the invention comprises a crown reinforced by a reinforcement referred to as a crown reinforcement, two beads intended to be in contact with seats of a mounting rim and two sidewalls, each sidewall connecting said crown to a bead. This tire comprises first reinforcing threads forming a carcass reinforcement of the tire.

To ensure that it is held in the beads when the tire is inflated, this carcass reinforcement is anchored within each bead to an anchoring structure comprising at least one second circumferentially oriented reinforcing thread cooperating with an adjacent portion of the carcass reinforcement by means of an anchoring material. This anchoring or connecting material is a rubber mix based on elastomer and is in contact both with the first reinforcing threads of the carcass reinforcement and the second reinforcing threads of the anchoring structure directly adjacent to the first reinforcing threads.

The anchoring material has an elasticity modulus for a deformation of 10% which is at least equal to 30 MPa and a creep resistance under tension appropriate for resisting the different forces to which the tire according to the invention is subjected.

This tire is characterized in that it comprises, axially on either side of the anchoring structure of the carcass reinforcement, a rubber mix referred to as a "decoupling mix", this decoupling mix having an elasticity modulus, at 10% deformation, less than half of the elasticity modulus of the anchoring mix.

Preferably, the modulus of the decoupling mix is at most equal to 20 MPa.

Each bead may, furthermore, comprise a profiled element of rubber mix forming the outside of said bead, this profiled element, referred to as a "protecting profiled element" and intended to come into contact with a mounting rim of the tire, having an elasticity modulus for a deformation of 10% at most equal to 10 MPa. This same profiled element covers axially and radially towards the inside said bead to form, inter alia, the part referred to as the "bead toe".

Advantageously, part of the profiled element of decoupling mix is placed axially between the protecting profiled element and the anchoring structure.

The first reinforcing threads may be arranged adjacent in the circumferential direction in at least one circumferential alignment from at least one of said beads to one of said sidewalls. Preferably, the first reinforcing threads form forward and return paths arranged adjacently, with, within said bead, loops connecting one forward to one return path each time. These first reinforcing threads may be oriented substantially radially.

It is also possible to produce the first reinforcing threads by grouping them in the form of strips and laying these strips one after another to form the carcass reinforcement.

BRIEF DESCRIPTION OF THE DRAWINGS

Other characteristics and advantages of the invention will become apparent from the description given hereafter with reference to the appended figures, which show, by way of non-limitative examples, two variant embodiments of the subject of the invention.

DESCRIPTION OF THE PREFERRED EMBODIMENTS

Figure 1:
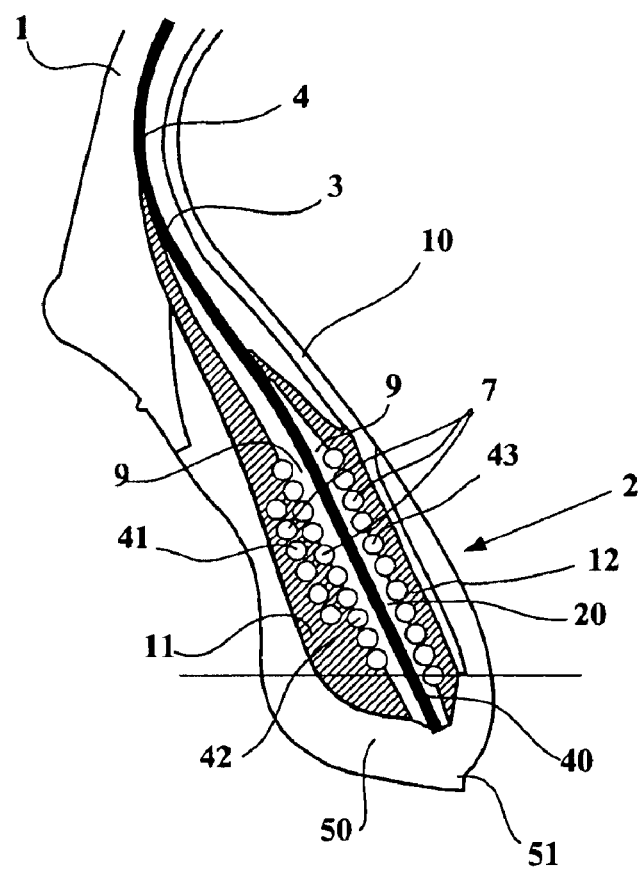
FIG. 1 is a view in a transverse section plane showing partially a sidewall and a bead of a tire according to the invention and comprising an anchoring structure with three circumferential windings.

In FIG. 1 a partial view of a tire according to the invention is shown in a transverse (or meridian) section plane, that is to say, a plane containing the axis of rotation of said tire. This tire comprises a sidewall 1 adjacent to a bead 2. A carcass reinforcement 3 extends circumferentially from the bead 2 towards the sidewall 1 and comprises in the example illustrated a circumferential alignment of first reinforcing threads 4. The first reinforcing threads 4 are oriented in the meridian direction (that is to say, forming an angle equal or close to 90° with the circumferential direction perpendicular to the plane of the figure) in the beads and have end parts 40.

The bead comprises a protecting profiled element 50 axially to the outside of the bead and extending radially to the inside of said bead; this protecting profiled element 50 is intended to ensure contact of the bead with a mounting rim of the tire. Furthermore, this protecting profiled element 50 is extended axially to the inside and radially towards the outside to form at least in part the end radially and axially to the inside of the bead referred to as the "bead toe" 51.

Within each bead, the first reinforcing threads 4 are anchored by their ends 40 to an anchoring structure 20 comprising two main elements, namely second circumferential reinforcing threads 7 and an anchoring rubber mix 9 of appropriate mechanical properties.

In the variant shown in FIG. 1, the second circumferential reinforcing threads 7 are arranged in two circumferential windings 41 and 42 of second reinforcing threads 7 axially to the outside of the ends 40 and a third circumferential winding 43 of second reinforcing threads 7 which are arranged axially to the inside of the ends 40. The second reinforcing threads 42 and 43 directly adjacent to the ends 40 of the first reinforcing threads 4 cooperate mechanically with said first reinforcing threads 4 by means of an anchoring rubber mix 9. This anchoring mix 9 is arranged axially to the inside and to the outside of the ends 40 of the first reinforcing threads 4, between these ends and the circumferential windings 42 and 43 of second reinforcing threads 7 directly adjacent to said ends 40.

This direct contact between the anchoring rubber mix 9 and the first 4 and second 7 reinforcing threads in the anchoring zone 20 is essential to produce effective anchoring of the first reinforcing threads 4 in the anchoring structure (effective anchoring means that the forces to which the first reinforcing threads 4 are subjected, which are due in particular to the inflation pressure of the tire by the second reinforcing threads 7, are taken up without creating excessive stresses both in these reinforcing threads and in the anchoring mix).

The anchoring rubber mix 9 has the essential mechanical properties:

a rigidity such that its modulus of extension at 10% deformation is in this case greater than 50 MPa, excellent creep resistance at high temperature very good stability at high temperature.

The second reinforcing threads 7 are substantially inextensible and may be, for example, metal cables. The first reinforcing threads 4 in the case illustrated are textile reinforcing threads of high elasticity modulus (aramid reinforcing threads).

Axially to the inside of the sidewall of the tire, there is a conventional rubber mix 10 referred to as "internal mix", the function of which is to ensure satisfactory airtightness with regard to the inflation atmosphere of the tire; this internal mix 10 is extended substantially at the level of the end radially to the inside of the axially innermost winding and is itself partially covered axially to the inside by the protective mix 50 forming the bead toe 51.

In order to facilitate the mounting of the bead on a mounting rim and to ensure good placement, the anchoring structure 20 is arranged between two decoupling profiled elements 11 and 12 extending from the radially innermost part of the end 40 and as far as radially beyond the radially outermost ends of the windings of the anchoring structure. These two decoupling profiled elements 11 and 12 are made of rubber mix having an elasticity modulus at 10% deformation close to 15 MPa.

The same rubber mix constituting the decoupling profiled element 11 also coats the reinforcing threads of the axially outermost circumferential winding 41 and provides the mechanical connection between this axially outermost winding 41 and the winding 42 adjacent thereto.

The presence of these two profiled elements of decoupling rubber mix 11 and 12 axially on either side of the carcass anchoring structure 20 surprisingly provides an answer to the problem caused by the mounting of this type of tire on a rim comprising in the vicinity of at least one of its seats a protrusion of low height ("hump") intended to prevent the axial displacement of the bead relative to the rim in the event of a partial or total loss of inflation pressure.

In another variant (not shown), the anchoring structure is formed of two adjacent windings on either side of the end of the carcass reinforcement.

Figure 2:
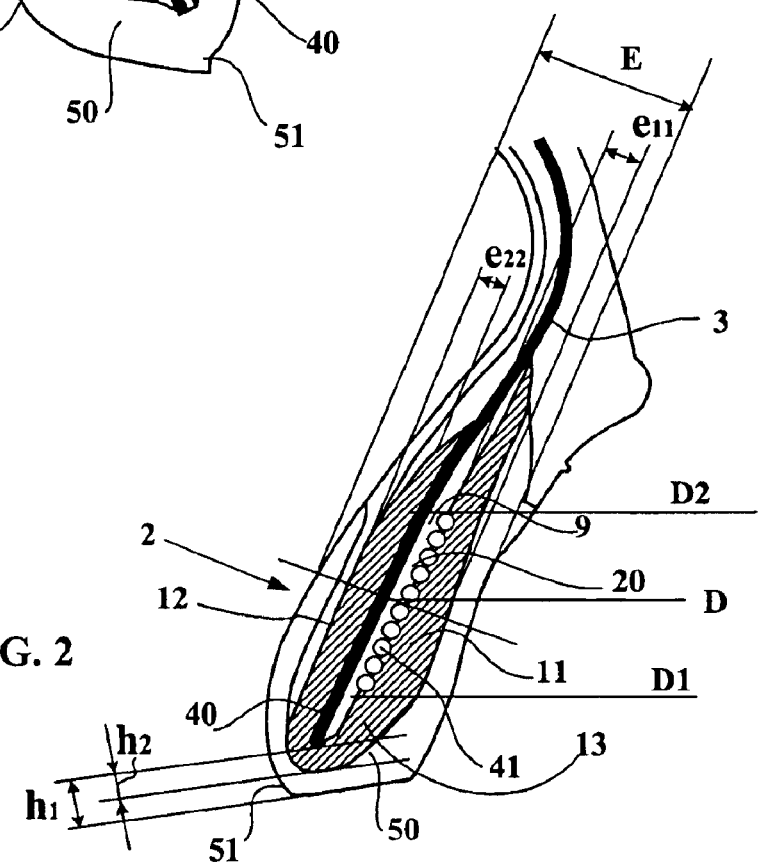
FIG. 2 shows a partial transverse section through a bead of a tire according to the invention having an anchoring structure with a single circumferential winding.

The second variant presented with the support of FIG. 2 is distinguished from the first variant of FIG. 1 in that:

the anchoring structure 20 comprises only a single winding of second circumferential reinforcing threads 41 arranged axially to the outside of the end 40 of the carcass reinforcement 3, the mechanical coupling between said winding 41 and the carcass reinforcement 3 being effected by means of an anchoring mix 9 of an elasticity modulus greater than 30 MPa;

this anchoring structure 20 is enveloped in a U-shaped profiled element 13 of decoupling mix extending axially on either side of said structure to form two branches 11 and 12, said two branches being themselves joined radially to the inside.

The circumferential reinforcing threads forming the single winding advantageously cooperate on one hand, on a first side, with the anchoring mix, and on the other hand, on the second side, with the decoupling mix without there being any reduction in the mechanical effectiveness of the anchoring structure.

Preferably, the total of the average thicknesses of the decoupling profiled elements 11 and 12, e11 and e22 respectively, is at least equal to half the total thickness E of the bead.

"Average thickness of a decoupling profiled element" is understood to mean the average thickness measured perpendicular to the carcass reinforcement substantially at half the height of the anchoring structure 20 (this position is marked in FIG. 2 by a straight-line segment D parallel to the axis of rotation of the tire and traced halfway between the two segments D1 and D2 passing respectively through the points of the anchoring reinforcement which are radially innermost and radially outermost. The bead thickness is measured at the same level and in the same direction.

Advantageously, when the decoupling profiled element is U-shaped and is located on either side of the end 40 of the carcass reinforcement, the thickness h2 of said profiled element radially to the inside of said end is at least equal to half the total thickness h1 of the bead (measured as the total thickness between said end and the seat of the bead).

In another variant (also not shown), the reinforcement for anchoring with at least one winding is located axially to the inside of the end 40 of the carcass reinforcement.

The examples which have just been described with the support of FIGS. 1 and 2 may have various embodiments, in particular as far as the carcass reinforcement is concerned: for example, it is possible to use a continuous cord to form this carcass reinforcement, the ends 40 then being in the form of loops in the bead, or alternatively individual cords laid successively or by strips joining several cords.

By way not of limitation, it should be noted that the tires according to the invention may advantageously be built using a process which does not involve any, or only a slight, change of form in the uncured state. For example, the blank of the fixture tire can be assembled on a rigid core which imposes the form of its inner cavity. There are applied to this core, in the order required by the final architecture, all the constituents of the tire, which are arranged directly in their final position, without undergoing shaping at any moment of the building operation. This building may in particular use the devices described in Patent EP 0243851 for the laying of the reinforcing threads of the carcass reinforcement and EP 0264600 for the laying of the rubber compositions. The tire can then be molded and vulcanized as set forth in U.S. Pat. No. 4,895,692.

What is claimed is:

1. A tire comprising a crown reinforced by a crown reinforcement, two beads intended to be in contact with seats of a mounting rim and two sidewalls, each sidewall connecting said crown to a bead, this tire comprising first reinforcing threads forming a carcass reinforcement, each bead comprising an anchoring structure for the carcass reinforcement formed of at least one circumferentially oriented second reinforcing thread cooperating with an adjacent portion of the carcass reinforcement by means of an anchoring rubber material having an elasticity modulus at 10% deformation at least equal to 30 MPa, and axially on either side of the anchoring structure of the carcass reinforcement, a rubber mix referred to as a "decoupling mix", this decoupling mix having an elasticity modulus, at 10% deformation, less than half of the elasticity modulus of the anchoring mix.

2. The tire according to claim 1, wherein each bead furthermore comprises a profiled element of rubber mix forming the outside of said bead, this profiled element, referred to as a "protecting profiled element" and intended to come into contact with a mounting rim of the tire, having an elasticity modulus for a deformation of 10% at most equal to 10 MPa, the decoupling mix being located between the protecting profiled element and the anchoring structure.

3. The tire according to claim 1, wherein the modulus of the decoupling mix is at most equal to 20 MPa.

4. The tire according to claim 2, wherein the modulus of the decoupling mix is at most equal to 20 MPa.

5. The tire according to claim 1, wherein the first reinforcing threads are arranged adjacent in the circumferential direction in at least one circumferential alignment from at least one of said beads to one of said sidewalls to form a carcass reinforcement of the tire, the reinforcing threads of this reinforcement being oriented substantially radially.

6. The tire according to claim 5, wherein the total of the average thicknesses of the decoupling profiled elements is at least equal to half the thickness of the bead, measured at mid-height of the anchoring structure.

7. The tire according to claim 1, wherein for at least one winding of circumferential reinforcing threads, said reinforcing threads cooperate on one hand, on a first side, with the anchoring mix, and on the other hand, on the second side, with the decoupling mix.

8. The tire according to claim 6, wherein for at least one winding of circumferential reinforcing threads, said reinforcing threads cooperate on one hand, on a first side, with the anchoring mix, and on the other hand, on the second side, with the decoupling mix.

* * * * *